Patented Aug. 2, 1932

1,869,517

UNITED STATES PATENT OFFICE

JAMES W. SINDEN, OF STATE COLLEGE, PENNSYLVANIA, ASSIGNOR TO THE PENNSYLVANIA STATE COLLEGE OF STATE COLLEGE, PENNSYLVANIA, A CORPORATION OF PENNSYLVANIA

MUSHROOM SPAWN AND METHOD OF MAKING SAME

No Drawing. Application filed March 17, 1931. Serial No. 523,381.

This invention relates to the making of spawn for the mushroom industry and has particular reference to the preparation of a spawn in a simple fashion and in a condition to facilitate planting.

Horse manure or a mixture of this and cow manure has been long used as the basis of spawn making. As now carried out the process is as follows:

Horse manure is composed under natural conditions in a pile at high temperatures for three weeks or until the offensive odor has disappeared and the straw is in a pliable state and dark brown in color. The manure is then placed in large vats and washed thoroughly with running water until most of the easily soluble brown coloring matter has washed away and the water runs amber yellow or clear. The material is now water-saturated and must be dried before use. This is done in at least two ways. The most modern method is to place the material in a centrifugal drier and to centrifuge it till the manure is barely moist to the hand.

The older method is to spread the material out in the sun and allow it to dry with frequent stirring until the desired moisture content has been reached.

The long straw is next removed either by screening through a coarse screen or by hand picking so that the final material is a rather finely divided damp substance of inoffensive odor, made up of the decomposed manure and short bedding straw and having the following approximate chemical constitution:

| | | |
|---|---|---|
| Water | 65.00% | |
| Carbohydrate | 16.47% | Hemicellulose 4.43% |
| | | Cellulose 2.09% |
| | | Lignin 9.95% |
| Protein | 2.50% | |
| Phosphorus ($P_2O_5$) | 0.26% | |
| Potassium ($K_2O$) | 0.70% | |
| Nitrogen ($N_2$) (total) | 0.50% | |

The manure so processed is hand packed into quart bottles, milk bottle shape, by the new method, or pressed into bricks of about the building brick size by the older now nearly obsolete method. In the former method the milk bottles are packed full and then a hole is bored through the center of the manure from top to bottom to give adequate air space. After the hole has been bored the bottles are stopped with cotton plugs which allow free interchange of gas but prevent the passage of bacteria or other microorganisms. The bottles so prepared are ready for sterilization which is carried out under steam pressure in large chambers or autoclaves where the bottles and their contents are subjected to 20 pounds steam pressure, and 120° C. for about 4–6 hours. The steam pressure is allowed to subside at the end of that time and after the bottles are cool they are ready for inoculation.

This inoculation is accomplished by transferring a small portion of a pure culture, previously grown in a similar bottle, to the center of the sterile bottle of manure with a pair of long forceps. This operation requires special care to avoid contamination of the sterile medium with foreign organisms during the time while the cotton plug is out of the bottle and the culture inoculum is being placed in it. Contamination may come from the air of the room or from the forceps being manipulated by the inoculator. Therefore, this operation is usually performed under strictly sterile conditions in a room specially constructed to prevent air currents from disseminating contaminants and with forceps heat sterilized in a small flame.

The bottles following inoculation are removed to a culture chamber which is maintained at a temperature of 20°–25° C. (68°–77° F.) and at a high humidity where they are allowed to incubate for a month or six weeks. During this time the mycelium or thready vegetative growth of the mushroom plant spreads out through the manure in the bottle until it has penetrated to all parts of it and is in such abundance as to hold the manure together in a compact mat or cake. The spawn, as it is now called, is ready for planting although it may be preserved for several months without deterioration at refrigeration temperatures 0° C.–5° C. (32°–41° F.).

This material is sold to the mushroom growers as bottle spawn. In order to use it, they smash the bottle and break up the cake of spawn into about 40 pieces approximately the size of a walnut. These are planted in that the material from one bottle would, if planted in a single row, cover 33 feet of row 10 inches wide. The compost in the beds is lifted with one hand and the spawn piece planted with the other about two inches below the surface of the bed. There it starts to grow and after a month to six weeks has penetrated throughout the compost in the beds and is ready to produce mushrooms.

The new method is performed as follows, the scientific name of the plant involved being various species of the genus Agaricus or Psalliota commonly known collectively under the name *Agaricus campestris*.

Cereals or cereal products such as hominy, cracked wheat, whole grain wheat, barley, rye, oats, rice, etc. (also other seeds as clover, bean, pea, etc. or ground-up corn cob) form the basis of this method. While all of these are suitable, the following relates to the use of wheat which seems to be particularly favorable for attaining the desired result, a similar method applying to the others.

Grain, using wheat as an example, is placed in a vessel and to it is added an amount of water which will allow the grain to swell during the cooking and will increase its water content. The grain may be sterilized in excess water which is later poured off, or preferably the proportion of water may be so limited in the first place that there will be no excess. The vessel should be of such a nature that it may be stoppered with cotton so that after sterilization under steam pressure the culture medium may be maintained sterile. These stoppered vessels are then subjected to steam pressure of 15 to 20 pounds for not longer than an hour.

The composition of the material after sterilization is approximately as follows:

| | |
|---|---|
| Water | 71.12% |
| Carbonhydrate | 24.36% |
| Starch | 20.0% |
| Fiber | 0.7% |
| Sugar (dextrose) | 1.66% |
| Dextrin | 2.00% |
| Protein | 3.64% |
| Potassium ($K_2O$) | 0.20% |
| Phosphorus ($P_2O_5$) | 0.32% |
| Ash | 0.64% |

These vessels of sterile cooked cereal are then inoculated with a culture by placing a bit of the pure mycelium, (pure as to the organism involved) from any source or on any medium, in the vessels. The vessels are incubated at 20°–25° C. until the substrate or culture medium is thoroughly overgrown with the mycelium. This may be hastened by shaking up the vessels at intervals, thus distributing the mycelium throughout the vessels and at the same time keeping the wheat grains or other units separate from each other.

After the mycelium has overgrown the individual grains or units in the vessel and each is covered with a mat of it, the spawn is ready for use. It is shaken out of the bottle and the lumps broken up. It may be planted in hills as with the previous method or better in rows as radish or carrot seed are planted and this may be done by hand or with some seed drill. The spawn is buried 2 inches into the compost as in the previous method. It may be distributed to the users either in the original vessel or in any other fit container.

The differences between the old and new methods are quite marked. First, there is a difference in the composition of the substrate or culture medium. In the previous method, this is manure treated in such a manner as to remove considerable of the nitrogen normally present as soluble or finely divided material. In the new method this is cereal (or products of cereals or seeds similar in nature) of high protein content and higher water content, no food being removed during the manufacture.

The state of division of the substrate is also different. In the previous method the manure is packed compactly into bottles or bricks so that on completion of the process it can be broken apart only with difficulty and, as bread might be broken, into lumps rather than being divisible into its original units at any time as is the case in the new method.

Whereas in the previous method it is necessary to compost the manure in piles, wash it, pack it by hand into bottles and drill a hole into it with an auger, in the new method the dry material, such as wheat, is placed directly into the vessel and to it is added an appropriate amount of water. There is thus avoided a considerable amount of the labor tending to render the old process costly.

The inoculation is also far more readily effected. Whereas it is necessary in the previous method to introduce the inoculum into the vessel with some instrument, in the new method it may be introduced without any instrument, as by shaking a few grains from a previously grown culture on cereal into the vessel of sterile medium.

The ease of distribution constitutes one of the primary advantages of the invention. In the previous method the material had to be marketed in its original container as it could not be removed from it without breaking the container. In the new method the spawn may be distributed in any sort of appropriate container as it is easily removable from the original vessel.

Whereas in the old method the spawn must be broken into pieces of an approximately even size which are then planted individually at intervals in the beds, in the new method the spawn already divided into small separate units, may be advantageously planted in rows or with a drill as well as being applicable to the old hill method.

The advantages of the new method over the old may be summarized as follows:

1. The substrate of the previous method after undergoing the process of washing and drying is depleted in essential food elements especialy nitrogen and rather dry in texture so that after the mycelium has grown upon it for a month it has nearly exhausted the food in the medium and is in a comparatively dry state so that it has lost a large part of its vigor and vitality. The new method in which none of the food elements are removed by the process has a larger original amount of food and water available and at the time it is ready for use the mycelium is in a vigorous, active state and can draw upon the substrate for further food after it has been placed in the beds. This allows faster growth and may tend to the production of larger mushrooms.

2. The preparation of the substrate for use as a culture medium heretofore involved a considerable amount of hand labor and the use of rather expensive machinery which necessitates an investment too large for the individual grower and make the initial cost of manufacture large. This cost to the grower is increased by the monopolistic nature of the process resulting from the large investment so that the price charged is out of proportion to the actual cost of manufacture. The new method does away with all preliminary handling and eliminates the initial cost and contingent expense of running the machinery. This brings the process to a cost within the individual grower's reach so that he can economically make his own spawn and so simplifies the process that so much technical knowledge is no longer necessary to successful manufacture of the spawn.

3. The previous method requires very careful operation on the part of the person inoculating the bottles in order to prevent contamination, while the new method eliminates much of this care by reason of the simplicity of the inoculation, and the rapidity with which it may be accomplished.

4. Since the previous method requires marketing in the original container—a bottle of quart milk bottle shape—which is of necessity broken before the spawn may be used, the cost to the grower involves the expense of these containers, about six cents per bottle. By the new method the spawn may be marketed either in the original container which would be returnable or in an inexpensive paper or cardboard container which would decrease the cost to the grower.

5. The previous method requires the breaking up of the spawn chunk into pieces which must be done by hand labor and then the planting in individual pieces, a time consuming process. The new method allows the user to plant his beds without any preliminary handling of the spawn and in such a manner that the material is treated as a homogeneous substance rather than as individual pieces which must be twice individually handled. By being able to plant the spawn in rows like seed, the user has the advantage of more even distribution within the bed so that he has the mycelium starting from many more foci. This results in faster filling the beds with mycelium and leads to an earlier production of his crops, an obvious advantage.

6. Where one quart bottle of the spawn made by the previous method will sow 33 feet of bed, 10 inches wide, a quart of the spawn made by the new method and planted in a row like seed will sow about 100 feet of row or three times as much. This in itself would reduce the amount of spawn necessary to one-third of the amount previously used.

Where in the following claims the term "cereal" is used it will be understood that it refers not only to the substances usually so designated but those substances which are the equivalents of grains in the above process, such as seeds, ground-up corn cob, or the like.

What I claim and desire to protect by Letters Patent is:

1. Mushroom spawn comprising a cereal substrate inoculated with mycelium.

2. Mushroom spawn comprising a cereal substrate overgrown with mycelium.

3. Mushroom spawn of granular form comprising a cereal substrate overgrown with mycelium.

4. The method of making mushroom spawn including sterilizing a cereal substrate, inoculating the substrate by introduction of a culture, and incubating until the substrate is overgrown with mycelium.

5. The method of making mushroom spawn including preparing a substrate by treating cereal material with water and sterilization, inoculating the substrate by introduction of a culture, and incubating until the substrate is overgrown with mycelium.

In testimony of which invention, I have hereunto set my hand, at State College, Pa., on this 11th day of March, 1931.

JAMES W. SINDEN.

DISCLAIMER 1,869,517.—*James W. Sinden*, State College, Pa. MUSHROOM SPAWN AND METHOD OF MAKING SAME. Patent dated August 2, 1932. Disclaimer filed December 2, 1938, by the assignee, *The Pennsylvania Research Corporation*.

Hereby enters this disclaimer to those parts of the specification of said patent which are in the following words, to wit:

"oats, rice, etc. (Also other seeds as clover, bean, pea, etc. or ground-up corn cob)." (Page 2, lines 18 and 19.)

"or seeds similar in nature." (Page 2, line 81.)

"Where in the following claims the term 'cereal' is used it will be understood that it refers not only to the substances usually so designated but those substances which are the equivalents of grains in the above process, such as seeds, ground-up corn cob, or the like." (Page 3, lines 81 to 86, inclusive.)

And your petitioner hereby disclaims from the scope of claims 1, 2, and 3 any cereal substrate which does not include a member of the group of cereals and cereal products consisting of hominy, cracked wheat, whole grain wheat, barley, and rye.

And your petitioner hereby disclaims from the scope of claims 4 and 5 any method of making mushroom spawn in which the cereal substrate does not include a member of the group of cereals and cereal products consisting of hominy, cracked wheat, whole grain wheat, barley, and rye.

[*Official Gazette December 20, 1938.*]